(12) United States Patent
Yamahara et al.

(10) Patent No.: US 9,374,865 B2
(45) Date of Patent: Jun. 21, 2016

(54) LIGHTING DEVICE, ILLUMINATING DEVICE AND LIGHT FIXTURE

(71) Applicant: Panasonic Intellectual Property Management Co., Ltd., Osaka (JP)

(72) Inventors: Daisuke Yamahara, Osaka (JP); Takeshi Kamoi, Kyoto (JP); Hiroshi Kido, Osaka (JP); Akinori Hiramatu, Nara (JP); Katsushi Seki, Shiga (JP); Daisuke Ueda, Osaka (JP); Shigeru Ido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/796,287

(22) Filed: Jul. 10, 2015

(65) Prior Publication Data

US 2016/0037594 A1 Feb. 4, 2016

(30) Foreign Application Priority Data

Jul. 29, 2014 (JP) ................................. 2014-154157

(51) Int. Cl.
*H05B 37/02* (2006.01)
*H05B 33/08* (2006.01)

(52) U.S. Cl.
CPC .......... *H05B 33/083* (2013.01); *H05B 33/0809* (2013.01)

(58) Field of Classification Search
CPC ............. H05B 33/0815; H05B 33/083; H05B 33/0827; H05B 33/089; H05B 33/0821
USPC .................. 315/187, 201, 193, 318
See application file for complete search history.

(56) References Cited

U.S. PATENT DOCUMENTS

| 2005/0021020 | A1 | 1/2005 | Blaha | |
|---|---|---|---|---|
| 2012/0262075 | A1* | 10/2012 | Lynch | H05B 33/0818 315/192 |
| 2012/0299495 | A1* | 11/2012 | Sakuragi | H05B 33/0812 315/201 |
| 2012/0313541 | A1* | 12/2012 | Egawa | H05B 33/0827 315/201 |
| 2014/0145632 | A1* | 5/2014 | Wey | H05B 33/0815 315/193 |

FOREIGN PATENT DOCUMENTS

| JP | 2004-337613 A | 12/2004 |
|---|---|---|
| JP | 2006-147933 A | 6/2006 |
| JP | 2012-009271 A | 1/2012 |
| JP | 2012-084580 A | 4/2012 |
| JP | 2012-244137 A | 12/2012 |
| JP | 2013-161937 A | 8/2013 |

* cited by examiner

*Primary Examiner* — Daniel D Chang
(74) *Attorney, Agent, or Firm* — Renner, Otto, Boisselle & Skylar, LLP (57) ABSTRACT

A lighting device includes a rectifier, a constant current regulator and a charge-discharge circuit. The constant current regulator is electrically connected in series with first and second solid-state light-emitting element arrays between a pair of output terminals of the rectifier. The constant current regulator is configured to adjust a current flowing through the second solid-state light-emitting element array to a constant current. The charge-discharge circuit is electrically connected in series with the first solid-state light-emitting element array between the pair of output terminals of the rectifier. The charge-discharge circuit includes a charge storage element, and is configured so that a charge current flows to the charge storage element through the first solid-state light-emitting element array, and so that a discharge current flows from the charge storage element to the second solid-state light-emitting element array.

7 Claims, 7 Drawing Sheets

LIGHTING DEVICE, ILLUMINATING DEVICE AND LIGHT FIXTURE

CROSS-REFERENCE TO RELATED APPLICATIONS

The application is based upon and claims the benefit of priority of Japanese Patent Application No. 2014-154157, filed on Jul. 29, 2014, the entire contents of which are incorporated herein by reference.

TECHNICAL FIELD

The disclosure relates to a lighting device configured to light solid-state light-emitting elements, an illuminating device including the lighting device and a light source that includes the solid-state light-emitting elements, and a light fixture including the illuminating device.

BACKGROUND ART

JP2006-147933A (hereinafter, referred to as "Document 1") discloses a light-emitting diode lighting device as a conventional example. This conventional example includes a rectifier circuit, a light-emitting diode circuit, a current limiting resistor, and a lighting control circuit. The rectifier circuit is configured to full-wave rectify a sinusoidal AC voltage supplied from an AC power source of which effective value is 100 V to produce a pulsating voltage. The light-emitting diode circuit includes multiple light-emitting diodes which are connected in series with their polarities in the same direction. In the light-emitting diode circuit, the multiple light-emitting diodes are series-connected so that each anode of the light-emitting diode is directed to a positive side of the rectifier circuit and each cathode thereof is directed to a ground. The multiple light-emitting diodes of the light-emitting diode circuit is divided into multiple groups (first to sixth diode circuits) each of which includes a certain number of light-emitting diodes connected in series. The current limiting resistor is connected between the rectifier circuit and the light-emitting diode circuit to limit a current flowing through the light-emitting diode circuit.

The lighting control circuit includes first to sixth drive-switches which are individually connected in series with respect to the first to sixth diode circuits. The lighting control circuit is configured to turn on and off the first to sixth drive switch units in turn in accordance with an instantaneous value of the pulsating voltage from the rectifier circuit to thereby light the first to sixth diode circuits in stages.

Thus, the conventional example described in Document 1 changes (increases or decreases) the number of lighted light-emitting diodes (i.e., the number of light emitting diodes that are turned on) in accordance with the instantaneous value of the pulsating voltage. Accordingly, the multiple light-emitting diodes connected in series can be efficiently lit with a simple circuit structure.

In the conventional example described in Document 1, however, the light amount thereof varies according to the number of lighted light-emitting diodes. Further, in the conventional example in Document 1, there exists a period in which no light-emitting diode is lit. Thus, the flicker of the emitted light thereof may become a problem in some situations. Specifically, in video images taken by a video camera, the brightness of the images would be expected not to fluctuate frequently.

Besides, in a structure where a smoothing capacitor for smoothing the pulsating voltage is connected between output terminals of a rectifier circuit, there is a problem in that an excessive rush current flows through the smoothing capacitor upon the AC power being switched on.

SUMMARY OF INVENTION

The present disclosure is achieved in view of the above circumstances, and an object thereof is to provide a lighting device capable of suppressing the fluctuation of the light output while preventing defects such as an excessive rush current, an illuminating device including the lighting device and a light source, and a light fixture including the illuminating device.

A lighting device according to one aspect of the disclosure is configured to light a light source that includes at least first and second solid-state light-emitting element arrays. The lighting device includes a rectifier, a constant current regulator and a charge-discharge circuit that includes a charge storage element. The rectifier has a pair of input terminals and a pair of output terminals, and is configured to rectify a sinusoidal AC voltage received through the pair of input terminals to output a rectified pulsating voltage through the pair of output terminals. The constant current regulator is electrically connected in series with the first and second solid-state light-emitting element arrays between the pair of output terminals of the rectifier, and is configured to adjust a current flowing through the second solid-state light-emitting element array to a constant current. The charge-discharge circuit is electrically connected in series with the first solid-state light-emitting element array between the pair of output terminals of the rectifier. The charge-discharge circuit is configured so that a charge current flows to the charge storage element through the first solid-state light-emitting element array, and so that a discharge current flows from the charge storage element to the second solid-state light-emitting element array.

An illuminating device according to one aspect of the disclosure includes the lighting device and the light source that includes at least the first and second solid-state light-emitting element arrays.

A light fixture according to one aspect of the disclosure includes the illuminating device and a fixture body that holds the illuminating device.

BRIEF DESCRIPTION OF DRAWINGS

The figures depict one or more implementation in accordance with the present teaching, by way of example only, not by way of limitations. In the figures, like reference numerals refer to the same or similar elements where.

DESCRIPTION OF EMBODIMENTS (Embodiment 1)

A lighting device and an illuminating device according to Embodiment 1 will be described in detail with reference to FIGS. 1 and 2.

Figure 1:
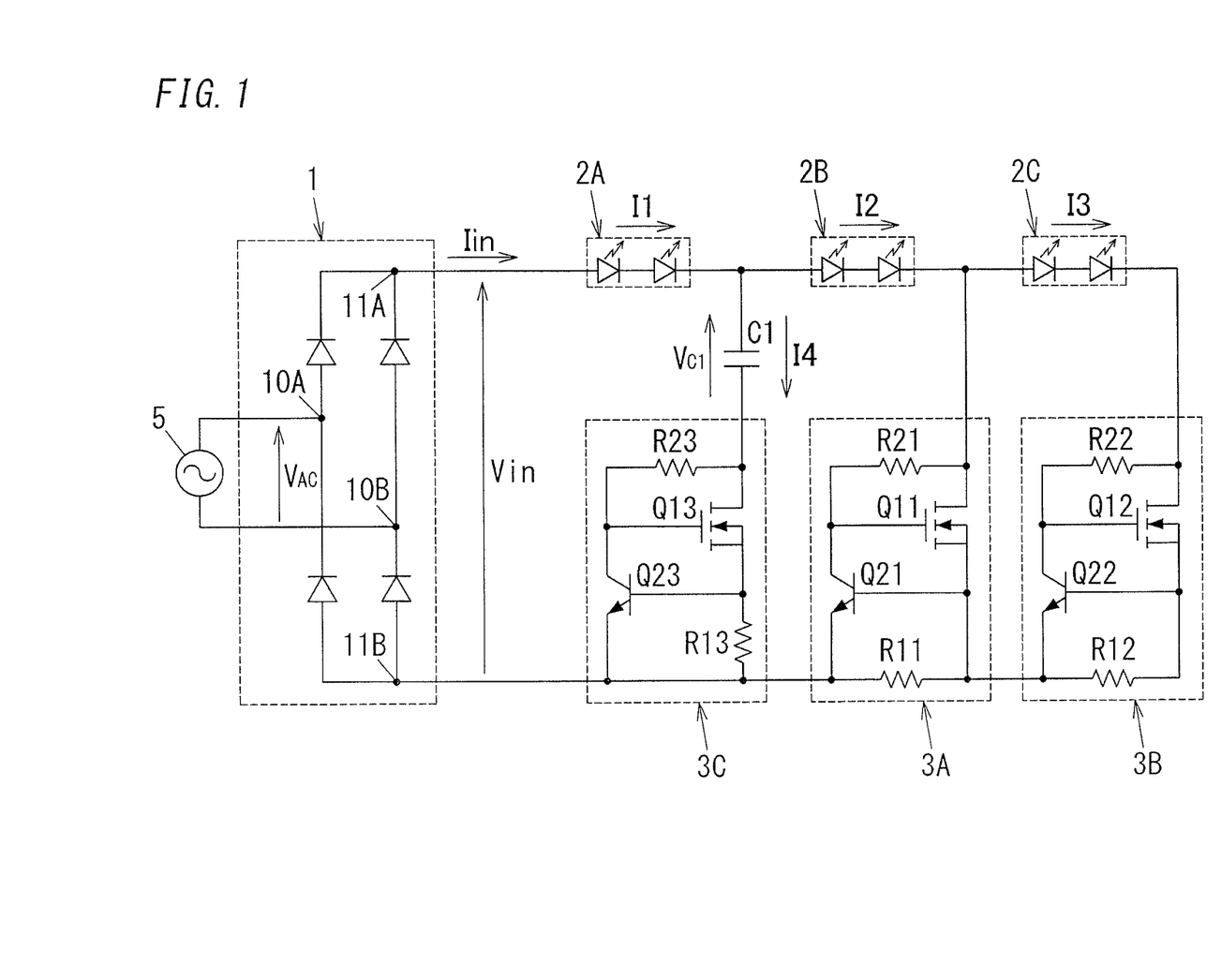
FIG. 1 is a circuit diagram of an illuminating device including a lighting device according to Embodiment 1.

As shown in FIG. 1, the illuminating device of the embodiment includes the lighting device and a light source. The light source includes two or more (three, in the illustrated example) solid-state light-emitting arrays (LED arrays 2A, 2B and 2C).

Each of the LED arrays 2A, 2B and 2C includes a series circuit of two light-emitting diodes (LEDs). However, the number of LEDs that form an LED array 2A, 2B, 2C is not limited to "two", and may be three or more. Thus, each of the LED arrays (the solid-state light-emitting element arrays) 2A to 2C includes a series circuit of two or more solid-state light-emitting elements.

The LED array 2A (hereinafter, referred to as "a first LED array 2A") is configured to emit light (to be turned on) by a current flowing therethrough when the potential difference between positive and negative electrodes thereof is a reference voltage Vf1 or more. The LED array 2B (hereinafter, referred to as "a second LED array 2B") is configured to emit light (to be turned on) by a current flowing therethrough when the potential difference between positive and negative electrodes thereof is a reference voltage Vf2 or more. The LED array 2C (hereinafter, referred to as "a third LED array 2C") is configured to emit light (to be turned on) by a current flowing therethrough when the potential difference between positive and negative electrodes thereof is a reference voltage Vf3 or more. The reference voltages Vf1, Vf2 and Vf3 depend on the number of LEDs connected in series (the reference voltage is, ideally, defined as a value obtained by multiplying a forward voltage of an LED by the number of LEDs connected in series), and may be the same with each other, or may be different.

The lighting device includes a rectifier 1, a first constant current regulator 3A, a second constant current regulator 3B, a third constant current regulator 3C, a charge storage element (a capacitor C1), and the like.

The rectifier 1 is formed of a diode bride, and has a pair of input terminals 10A and 10B (a first input terminal 10A and a second input terminal 10B) and a pair of output terminals 11A and 11B (a first output terminal 11A and a second output terminal 11B). An AC power source 5 is electrically connected between the pair of input terminals 10A and 10B. The AC power source 5 is configured to output a sinusoidal AC voltage of which effective value is 100 [V], for example. Therefore, a pulsating voltage, which is a rectified sinusoidal AC voltage and of which maximum value (peak value) is 141 (100×√2) [V], is outputted through the output terminals 11A and 11B of the rectifier 1. The rectifier 1 is configured so that the first output terminal 11A is higher in potential than the second output terminal 11B.

The positive electrode of the first LED array 2A is electrically connected to the first output terminal 11A of the rectifier 1. The negative electrode of the first LED array 2A is electrically connected to the positive electrode of the second LED array 2B. The negative electrode of the second LED array 2B is electrically connected to the positive electrode of the third LED array 2C.

The first constant current regulator 3A is formed of a constant current circuit having two transistors Q11 and Q21 and two resistors R11 and R21. The transistor Q11 is an n-channel MOSFET (metal-oxide-semiconductor field-effect-transistor). The transistor Q21 is an npn bipolar transistor. A drain electrode of the transistor Q11 is electrically connected to the negative electrode of the second LED array 2B and the positive electrode of the third LED array 2C. A source electrode of the transistor Q11 is electrically connected to a base of the transistor Q21 and a first end of the resistor R11. A first end of the resistor R21 is electrically connected to the drain electrode of the transistor Q11. A second end of the resistor R21 is electrically connected to a gate electrode of the transistor Q11 and a collector of the transistor Q21. The first end of the resistor R11 is electrically connected to a source electrode of the transistor Q11 and the base of the transistor Q21. A second end of the resistor R11 is electrically connected to an emitter of the transistor Q21.

The first constant current regulator 3A is configured to feedback control a collector current of the transistor Q21 to thereby adjust a current flowing through the resistor R11 (a drain current of the transistor Q11) to a target current (target value). The target value depends on resistance values of the two resistors R11 and R12.

The second constant current regulator 3B is, similar to the first constant current regulator 3A, formed of a constant current circuit having two transistors Q12 and Q22 and two resistors R12 and R22. Circuit structure of the second constant current regulator 3B is the same as that of the first constant current regulator 3A, but the last letters (digits) of the reference numerals depicted to the constituent elements are changed. Specifically, a drain electrode of the transistor Q12 is electrically connected to the negative electrode of the third LED array 2C. A source electrode of the transistor Q12 is electrically connected to a base of the transistor Q22 and a first end of the resistor R12. A first end of the resistor R22 is electrically connected to the drain electrode of the transistor Q12. A second end of the resistor R22 is electrically connected to a gate electrode of the transistor Q12 and a collector of the transistor Q22. The first end of the resistor R12 is electrically connected to a source electrode of the transistor Q12 and the base of the transistor Q22. A second end of the resistor R12 is electrically connected to an emitter of the transistor Q22.

The second constant current regulator 3B is electrically connected in series with the third LED array 2C. The series circuit of the third LED array 2C and the second constant current regulator 3B is electrically connected across the drain and source electrodes of the transistor Q11 of the first constant current regulator 3A. Specifically, the drain electrode of the transistor Q11 and the negative electrode of the second LED array 2B are electrically connected to the positive electrode of the third LED array 2C. The second end of the resistor R12 (the emitter of the transistor Q22) of the second constant current regulator 3B is electrically connected to the first end of the resistor R11 of the first constant current regulator 3A.

Operations of the first and second constant current regulators 3A and 3B mutually affect to each other. Specifically, not only an output current of the first constant current regulator 3A (a drain current of the transistor Q11) but an output current of the second constant current regulator 3B (a drain current of the transistor Q12) flow through the resistor R11 of the first constant current regulator 3A. Therefore, the output current of the first constant current regulator 3A should be reduced due to the output current of the second constant current regulator 3B.

The third constant current regulator 3C is, similar to the first constant current regulator 3A and the second constant current regulator 3B, formed of a constant current circuit having two transistors Q13 and Q23 and two resistors R13 and R23. Circuit structure of the third constant current regulator 3C is the same as that of the first constant current regulator 3A, but the last letters (digits) of the reference numerals depicted to the constituent elements are changed. Specifically, a source electrode of the transistor Q13 is electrically connected to a base of the transistor Q23 and a first end of the resistor R13. A first end of the resistor R23 is electrically connected to the drain electrode of the transistor Q13. A second end of the resistor R23 is electrically connected to a gate electrode of the transistor Q13 and a collector of the transistor Q23. The first end of the resistor R13 is electrically connected to a source electrode of the transistor Q13 and the base of the transistor Q23. A second end of the resistor R13 is electrically connected to an emitter of the transistor Q23.

A first terminal (a positive terminal) of the capacitor C1 is electrically connected to the negative electrode of the first LED array 2A and the positive electrode of the second LED array 2B (a junction between the first LED array 2A and the second LED array 2B). A second terminal (a negative terminal) of the capacitor C1 is electrically connected to the drain electrode of the transistor Q13 of the third constant current regulator 3C. The series circuit of the second LED array 2B and the first constant current regulator 3A is electrically connected across both ends of the series circuit of the capacitor C1 and the third constant current regulator 3C. The series circuit of the third LED array 2C and the constant current regulator 3B is connected in parallel with respective to the series circuit of the capacitor C1 and the third constant current regulator 3C.

Operations of the lighting device (the illuminating device) in the embodiment will be described with reference to the circuit diagram of FIG. 1 and the waveform charts of FIG. 2.

Figure 2:
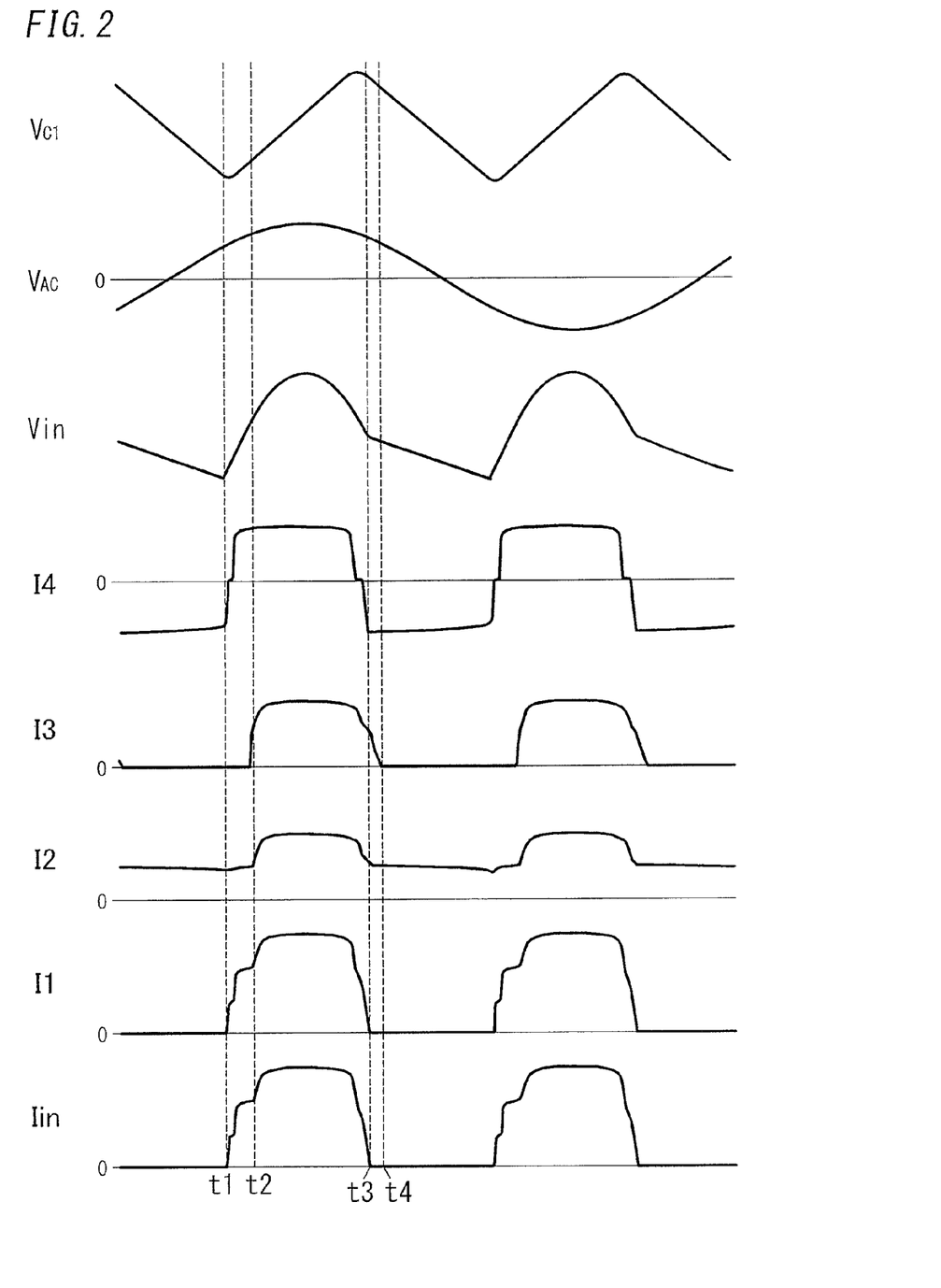
FIG. 2 is waveform charts illustrating operations in the Embodiment 1.

In FIG. 2, "VC1" illustrates a voltage across the capacitor C1 (the direction indicated by an arrow in FIG. 1 is defined as a positive direction). "VAC" illustrates a voltage of the AC power source 5. "Vin" illustrates an output voltage of the rectifier 1 (supply voltage). "I4" illustrates a current flowing through the capacitor C1 (the direction indicated by an arrow in FIG. 1 is defined as a positive direction). "I3" to "I1" respectively illustrate currents flowing through the third to first LED arrays 2C to 2A. "Iin" illustrates a supply current (an output current of the rectifier 1).

In a half cycle of the AC voltage of the AC power source 5, when the output voltage Vin of the rectifier 1 exceeds the total of the reference voltage Vf1 of the first LED array 2A and the voltage VC1 across the capacitor C1 (Vin>Vf1+VC1), the first LED array 2A becomes electrically conducting and a current I1 starts flowing through the first LED array 2A (time point t=t1). The current I3 flows through the capacitor C1 to the third constant current regulator 3C, and the current (a charge current) I4 flowing through the capacitor C1 is adjusted to a constant current by the operation of the third constant current regulator 3C. The first LED array 2A is lit (turned on) by the current I1 flowing therethrough.

The voltage VC1 across the capacitor C1 is applied to the second LED array 2B. Therefore, anterior and posterior the time point t=t1, a current I2 flows through the second LED array 2B. The current I2 flowing through the second LED array 2B is adjusted to a constant current by the first constant current regulator 3A. The second LED array 2B is lit (turned on) by the current I2 flowing therethrough.

When the output voltage Vin of the rectifier 1 increases to exceed the total of the reference voltages Vf1 to Vf3 of the first to third LED arrays 2A to 2C (Vin>Vf1+Vf2+Vf3), the third LED array 2C becomes electrically conducting and a current I3 starts flowing through the third LED array 2C (time point t=t2). The current I3 flows to the second constant current regulator 3B, and the current I3 flowing through the third LED array 2C is adjusted to a constant current by the operation of the second constant current regulator 3B. The third LED array 2C is lit (turned on) by the current I3 flowing therethrough.

Note that in a period after the time point t=t1 and in which the supply voltage Vin increases, the capacitor C1 is charged by the supply current Iin from the rectifier 1, and thus the voltage VC1 across the capacitor C1 gradually increases.

The output voltage Vin of the rectifier 1 passes through the maximum, and when the output voltage Vin decreases to be lower than the total of the reference voltage Vf1 of the first LED array 2A and the voltage VC1 across the capacitor C1 (Vin<Vf1+VC1), the first LED array 2A becomes electrically non-conducting and to be turned off (time point t=t3). Thus, the current I1 stops flowing through the first LED array 2A, and the charging of the capacitor C1 also stops. The electric energy (charged energy) in the capacitor C1 is then discharged, and a current (a discharge current I4) flows from the capacitor C1 to the series circuit of the second LED array 2B and the first constant current regulator 3A, and to the series circuit of the third LED array 2C and the second constant current regulator 3B. As a result, the second LED array 2B and the third LED array 2C are kept lit.

The voltage VC1 across the capacitor C1 gradually decreases according to the discharge. When the voltage VC1 across the capacitor C1 decreases to be lower than the total of the reference voltage Vf2 of the second LED array 2B and the reference voltage Vf3 of the third LED array 2C (Vin<Vf2+Vf3), the third LED array 2C becomes electrically non-conducting and to be turned off (time point t=t4). Thus, the current I3 stops flowing through the third LED array 2C, so that the second constant current regulator 3B stops operating. In this time, the third LED array 2C turns off (stops emitting light), whereas the second LED array 2B is kept lit by the discharge current I4 from the capacitor C1. In this time, the discharge current I4 from the capacitor C1 flows through a parasitic diode of the transistor Q13 in the third constant current regulator 3C.

Accordingly, with the lighting device (the illuminating device) of the embodiment, the capacitor C1 is charged by the supply current Iin around the peak of the supply voltage Vin, and the second LED array 2B can be lit by the discharge current I4 from the capacitor C1 around the valley of the supply voltage Vin. The lighting device (the illuminating device) of the embodiment continuously turns on the second LED array 2B during one cycle of the AC voltage of the AC power source 5, and thus can reduce ripple contained in the emitting light, compared with the conventional example. Further, with the lighting device (the illuminating device) of the embodiment, the capacitor C1 for smoothing is electrically connected between the output terminals 11A and 11B of the rectifier 1 via the first LED array 2A and the third constant current regulator 3C. Hence, the maximum voltage applied to the capacitor C1 corresponds to a voltage determined by subtracting the reference voltage Vf1 of the first LED array 2A from the maximum voltage of the output voltage Vin of the rectifier 1. A capacitor having a comparatively low breakdown voltage can be used as the capacitor C1, compared to a case where a capacitor is connected between the output terminals 11A and 11B of the rectifier 1. Moreover, since the lighting device (the illuminating device) of the embodiment includes the constant current circuit (the third constant current regulator 3C) connected in series with the charge storage element (the capacitor C1), it is possible to prevent a rush current from flowing through the capacitor C1.

As described above, the lighting device of the embodiment is a lighting device configured to light solid-state light-emitting element arrays (the first LED array 2A, the second LED array 2B and the third LED array 2C), each of which is a series circuit of two or more solid-state light-emitting elements (light-emitting diodes). The lighting device of the embodiment includes the rectifier 1, the constant current regulator (the first constant current regulator 3A, the second constant current regulator 3B), the charge storage element (the capacitor C1) and a charge-discharge controller (the third constant current regulator 3C). The rectifier 1 is configured to rectify the sinusoidal AC voltage received through the pair of input terminals 10A and 10B to output the resultant pulsating voltage through the pair of output terminals 11A and 11B. The constant current regulator (the first constant current regulator 3A, the second constant current regulator 3B) is electrically connected in series with two or more solid-state light-emitting element arrays (the second LED array 2B, the third LED array 2C) between the pair of output terminals 11A and 11B. The constant current regulator (the first constant current regulator 3A, the second constant current regulator 3B) is configured to adjust a current flowing through the solid-state light-emitting element array (the second LED array 2B, the third LED array 2C) to a constant current. The charge storage element (the capacitor C1) is electrically connected in series with one solid-state light-emitting element array (the first LED array 2A) and the charge-discharge controller (the third constant current regulator 3C) between the pair of output terminals 11A and 11B. The charge-discharge controller (the third constant current regulator 3C) is configured to control a charge current flowing to the charge storage element (the capacitor C1) through the above-identified one solid-state light-emitting element array (the first LED array 2A), and to cause a discharge current to flow from the charge storage element (the capacitor C1) through the solid-state light-emitting element array (the second LED array 2B or the third LED array 2C) other than the above-identified one solid-state light-emitting element array (the first LED array 2A). The charge-discharge controller includes a constant current circuit (the third constant current regulator 3C).

In other words, the lighting device of the embodiment is configured to light a light source that includes at least the first solid-state light-emitting element array (the first LED array 2A) and the second solid-state light-emitting diode arrays (the second LED array 2B). The lighting device includes the rectifier 1, the constant current regulator (the first constant current regulator 3A) and the charge-discharge circuit (the capacitor C1 and the third constant current regulator 3C). The rectifier 1 has the pair of input terminals 10A and 10B and the pair of output terminals 11A and 11B. The rectifier 1 is configured to rectify the sinusoidal AC voltage received through the pair of input terminals 10A and 10B to output the produced pulsating voltage through the pair of output terminals 11A and 11B. The constant current regulator (the first constant current regulator 3A) is electrically connected in series with the first and second solid-state light-emitting element arrays (the first and second LED arrays 2A and 2B) between the pair of output terminals 11A and 11B of the rectifier 1. The constant current regulator (the first constant current regulator 3A) is configured to adjust a current flowing through the second solid-state light-emitting element array (the second LED array 2B) to a constant current. The charge-discharge circuit (the capacitor C1 and the third constant current regulator 3C) is electrically connected in series with the first solid-state light-emitting element array (the first LED array 2A) between the pair of output terminals 11A and 11B of the rectifier 1. The charge-discharge circuit includes the charge storage element (the capacitor C1). The charge-discharge circuit is configured so that a charge current flows to the charge storage element (the capacitor C1) through the first solid-state light-emitting element array (the first LED array 2A), and so that a discharge current flows from the charge storage element (the capacitor C1) to the second solid-state light-emitting element array (the second LED array 2B).

In the lighting device of the embodiment, the charge-discharge circuit includes the constant current circuit (the third constant current regulator 3C) connected in series with the charge storage element (the capacitor C1).

As described above, with the lighting device of the embodiment, any of the solid-state light-emitting element arrays (the second LED array 2B) can be kept lit even around the valley of the pulsating voltage, by discharging the electric energy (charged energy) in the charge storage element (the capacitor C1). Furthermore, the rush current can be prevented from flowing through the charge storage element (the capacitor C1) by the charge-discharge circuit (the charge-discharge controller) that includes the constant current circuit (the third constant current regulator 3C). Accordingly, the lighting device of the embodiment can suppress the fluctuation of the light output while preventing the rush current.

(Embodiment 2)

A lighting device and an illuminating device according to Embodiment 2 will be described in detail with reference to FIGS. 3 and 4. The lighting device and the illuminating device of the embodiment have the basic structure common to that of the lighting device and the illuminating device of the Embodiment 1. Therefore, identical constituent elements to those of the lighting device and the illuminating device of the Embodiment 1 have been allocated identical reference numerals, and description thereof has been omitted as appropriate.

Figure 3:
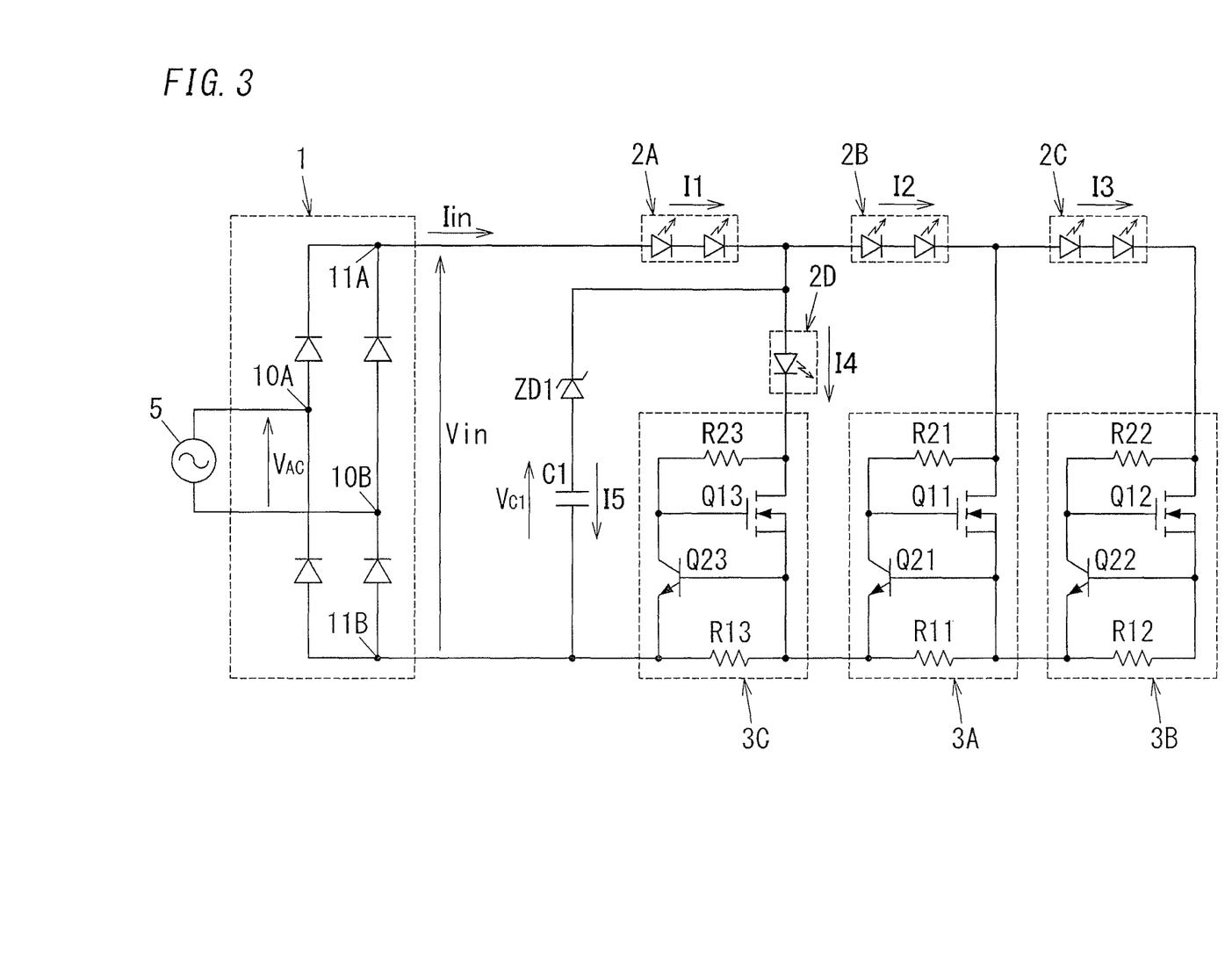
FIG. 3 is a circuit diagram of an illuminating device including a lighting device according to Embodiment 2.

As shown in FIG. 3, the lighting device of the embodiment preferably includes a series circuit of a charge storage element (a capacitor C1) and a constant voltage element (a zener diode ZD1). A cathode of the zener diode ZD1 is electrically connected to a negative electrode of a first LED array 2A and a positive electrode of a second LED array 2B (a junction between the first LED array 2A and the second LED array 2B). An anode of the zener diode ZD1 is electrically connected to a first terminal (positive terminal) of the capacitor C1. A second terminal (negative terminal) of the capacitor C1 is electrically connected to a second output terminal 11B of a rectifier 1.

In the lighting device of the embodiment, a fourth LED array 2D is electrically connected between the cathode of the zener diode ZD1 and a third constant current regulator 3C. The fourth LED array 2D includes a series circuit of two or more solid-state light-emitting elements. However, a single LED may be used instead of the fourth LED array 2D. A positive electrode (an anode) of the fourth LED array 2D is electrically connected to the negative electrode of the first LED array 2A, the positive electrode of the second LED array 2B, and the cathode of the zener diode ZD1. A negative electrode (a cathode) of the fourth LED array 2D is electrically connected to a drain electrode of a transistor Q13 of the third constant current regulator 3C. The fourth LED array 2D is configured to emit light (to be turned on) by a current flowing therethrough when the potential difference between positive and negative electrodes thereof is a reference voltage Vf4 or more. The reference voltage Vf4 is preferably set to be lower than a reference voltage Vf2 of the second LED array 2B.

In the embodiment, a second end of a resistor R11 of the first constant current regulator 3A is electrically connected to a first end of a resistor R13 (a source electrode of the transistor Q13) of the third constant current regulator 3C.

Operations of the lighting device (the illuminating device) in the embodiment will be described with reference to the circuit diagram of FIG. 3 and the waveform charts of FIG. 4.

Figure 4:
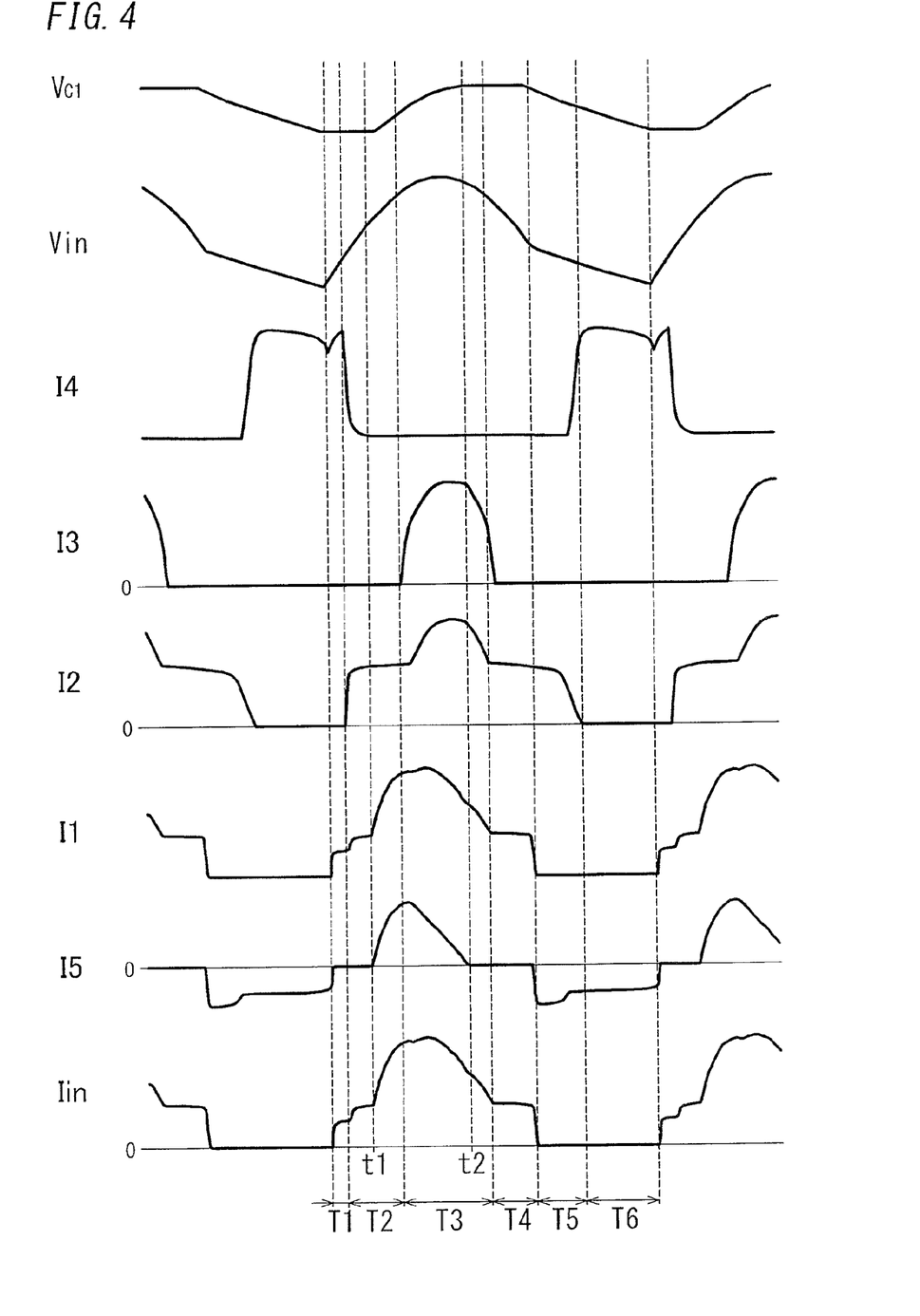
FIG. 4 is waveform charts illustrating operations in the Embodiment 2.

In FIG. 4, "VC1" illustrates a voltage across the capacitor C1 (the direction indicated by an arrow in FIG. 3 is defined as a positive direction). "Vin" illustrates an output voltage of the rectifier 1 (supply voltage). "I4" to "I1" illustrate currents flowing through the fourth LED array 2D to the first LED array 2A, respectively. "I5" illustrates a current flowing through the capacitor C1 (the direction indicated by an arrow in FIG. 3 is defined as a positive direction). "Iin" illustrates a supply current (an output current of the rectifier 1). As shown in FIG. 4, one cycle of a pulsating voltage of the rectifier 1 (a half cycle of an AC voltage of an AC power source 5) can be divided into six time periods T1 to T6.

(Time Period T1)

During the time period T1, the output voltage Vin of the rectifier 1 is higher than the total of the reference voltage Vf1 of the first LED array 2A and the reference voltage Vf4 of the fourth LED array 2D (Vin>Vf1+Vf4). Also, during the time period T1, the output voltage Vin of the rectifier 1 is lower than the total of the reference voltage Vf1 of the first LED array 2A and the reference voltage Vf2 of the second LED array 2B (Vin<Vf1+Vf2). In the time period T1, therefore, the first LED array 2A and the fourth LED array 2D are electrically conducting and a current I1, I4 flows through the first LED array 2A and the fourth LED array 2D. The current I4 flows to the third constant current regulator 3C, and the current I4 (I1) is adjusted to a constant current by the operation of the third constant current regulator 3C. The first LED array 2A and the fourth LED array 2D are lit by the current I1, I4 flowing therethrough.

(Time Period T2)

When the output voltage Vin of the rectifier 1 increases to exceed the total of the reference voltage Vf1 of the first LED array 2A and the reference voltage Vf2 of the second LED array 2B (Vin>Vf1+Vf2), the second LED array 2A becomes electrically conducting and a current I2 starts flowing through the second LED array 2B. The current I2 flows to the first constant current regulator 3A, and the current I2 (I1) is adjusted to a constant current by the operation of the first constant current regulator 3A. The first LED array 2A and the second LED array 2B are lit by the current I1, I2 flowing therethrough. In this period, the current I2 flows through the first constant current regulator 3A to the resistor R13 of the third constant current regulator 3C (see FIG. 3). The target value for the current I4 in the third constant current regulator 3C is apparently-reduced (the transistor Q13 is kept turned off), and the fourth LED array 2D turns off.

When the output voltage Vin of the rectifier 1 increases to exceed the total of the reference voltage Vf1 of the first LED array 2A, a zener voltage (breakdown voltage) VZD1 of the zener diode ZD1 and the voltage VC1 across the capacitor C1 (Vin>Vf1+VZD1+VC1), the zener diode ZD1 becomes electrically conducting and a current I5 flows to the capacitor C1 (time point t=t1). The capacitor C1 is therefore charged.

(Time Period T3)

When the output voltage Vin of the rectifier 1 increases to exceed the total of the reference voltages Vf1 to Vf3 of the first to third LED arrays 2A to 2C (Vin>Vf1+Vf2+Vf3), the third LED array 2C becomes electrically conducting and a current I3 starts flowing through the third LED array 2C. The current I3 flows to the second constant current regulator 3B, and the current I3 (I1, I2) is adjusted to a constant current by the operation of the second constant current regulator 3B. The first LED array 2A, the second LED array 2B and the third LED array 2C are lit by the current I1, I2, I3 flowing therethrough. By the current I3 flowing through the second constant current regulator 3B to the resistor R11, the first constant current regulator 3A stops operating.

The output voltage Vin of the rectifier 1 passes through the maximum, and when the output voltage Vin decreases to be lower than the total of the reference voltage Vf1 of the first LED array 2A, the zener voltage VZD1 of the zener diode ZD1 and the voltage VC1 across the capacitor C1 (Vin<Vf1+VZD1+VC1), the zener diode ZD1 becomes electrically non-conducting and the charging of the capacitor C1 stops (time point t=t2).

(Time Period T4)

When the output voltage Vin of the rectifier 1 decreases to be lower than the total of the reference voltages Vf1 to Vf3 of the first to third LED arrays 2A to 2C (Vin<Vf1+Vf2+Vf3), the third LED array 2C becomes electrically non-conducting, the second constant current regulator 3B stops operating, and the current I3 stops flowing through the third LED array 2A. Thus, the third LED array 2C turns off, and the first constant current regulator 3A restarts operating. By the first constant current regulator 3A operating, a current I1, I2 flows through the first LED array 2A and the second LED array 2B, and the first LED array 2A and the second LED array 2B are lit by the current flowing therethrough.

(Time Period T5)

When the output voltage Vin of the rectifier 1 decreases to be lower than the total of the reference voltage Vf1 of the first LED array 2A and the reference voltage Vf2 of the second LED array 2B (Vin<Vf1+Vf2), the electric energy (charged energy) in the capacitor C1 is discharged. The first constant current regulator 3A keeps operating in this period so that the current I2 flows through the second LED array 2B. The second LED array 2B is kept lit by the current I2 flowing therethrough. The output current of the rectifier 1 (the supply current Iin) stops, and the first LED array 2A turns off.

(Time Period T6)

The voltage VC1 across the capacitor C1 gradually decreases according to the discharge. When the voltage VC1 across the capacitor C1 decreases to be lower than the reference voltage Vf2 of the second LED array 2B (VC1<Vf2), the fourth LED array 2D becomes electrically conducting and the discharge current (the current I4) of the capacitor C1 flows through the fourth LED array 2D. The current I4 flows to the third constant current regulator 3C to start the third constant current regulator 3C operating, and the fourth LED array 2D is turned on. Then, the next time period T1 starts when the output voltage Vin of the rectifier 1 increases to exceed the total of the reference voltage Vf1 of the first LED array 2A and the reference voltage Vf4 of the fourth LED array 2D (Vin>Vf1+Vf4).

Accordingly, with the lighting device (the illuminating device) of the embodiment, the capacitor C1 is charged by the supply current Iin around the peak of the supply voltage Vin, and the fourth LED array 2D can be lit by the discharge current from the capacitor C1 around the valley of the supply voltage Vin. The lighting device (the illuminating device) of the embodiment continuously turns on any of the first to fourth LED arrays 2A to 2D during one cycle of the AC voltage of the AC power source 5, and thus can reduce ripple contained in the emitting light, compared with the conventional example. Furthermore, with the lighting device (the illuminating device) of the embodiment, there is no LED array that keeps turning on during one cycle of the AC power source 5 as is the second LED array 2B in the Embodiment 1. The lighting device (the illuminating device) of the embodiment can avoid a large current flowing in a specific LED array (the second LED array 2B), and accordingly can suppress differences in life times among the first to fourth LED arrays 2A to 2D.

As described above, the lighting device of the embodiment is a lighting device configured to light solid-state light-emitting element arrays (the first LED array 2A, the second LED array 2B and the third LED array 2C), each of which is a series circuit of two or more solid-state light-emitting elements (light-emitting diodes). The lighting device of the embodiment includes the rectifier 1, the constant current regulator (the first constant current regulator 3A, the second constant current regulator 3B), the charge storage element (the capacitor C1) and the charge-discharge controller (the zener diode ZD1). The rectifier 1 is configured to rectify the sinusoidal AC voltage received through a pair of input terminals 10A and 10B to output the resultant pulsating voltage through a pair of output terminals 11A and 11B. The constant current regulator (the first constant current regulator 3A, the second constant current regulator 3B) is electrically connected in series with two or more solid-state light-emitting element arrays (the second LED array 2B, the third LED array 2C) between the pair of output terminals 11A and 11B. The constant current regulator (the first constant current regulator 3A, the second constant current regulator 3B) is configured to adjust a current flowing through the solid-state light-emitting element array (the second LED array 2B, the third LED array 2C) to a constant current. The charge storage element (the capacitor C1) is electrically connected in series with one solid-state light-emitting element array (the first LED array 2A) and a charge-discharge controller (the zener diode ZD1) between the pair of output terminals 11A and 11B. The charge-discharge controller is configured to control a charge current flowing to the charge storage element (the capacitor C1) through the above-identified one solid-state light-emitting element array (the first LED array 2A), and to cause a discharge current to flow from the charge storage element (the capacitor C1) through the solid-state light-emitting element array (the second LED array 2B or the third LED array 2C) other than the above-identified one solid-state light-emitting element array (the first LED array 2A). The charge-discharge controller includes a constant voltage circuit (the zener diode ZD1).

In other words, the lighting device of the embodiment is configured to light a light source that includes at least the first solid-state light-emitting element array (the first LED array 2A) and the second solid-state light-emitting diode arrays (the second LED array 2B). The lighting device includes the rectifier 1, the constant current regulator (the first constant current regulator 3A) and the charge-discharge circuit (the capacitor C1 and the zener diode ZD1). The rectifier 1 has the pair of input terminals 10A and 10B and the pair of output terminals 11A and 11B. The rectifier 1 is configured to rectify the sinusoidal AC voltage received through the pair of input terminals 10A and 10B to output the produced pulsating voltage through the pair of output terminals 11A and 11B. The constant current regulator (the first constant current regulator 3A) is electrically connected in series with the first and second solid-state light-emitting element arrays (the first and second LED arrays 2A and 2B) between the pair of output terminals 11A and 11B of the rectifier 1. The constant current regulator (the first constant current regulator 3A) is configured to adjust a current flowing through the second solid-state light-emitting element array (the second LED array 2B) to a constant current. The charge-discharge circuit (the capacitor C1 and the zener diode ZD1) is electrically connected in series with the first solid-state light-emitting element array (the first LED array 2A) between the pair of output terminals 11A and 11B of the rectifier 1. The charge-discharge circuit includes the charge storage element (the capacitor C1). The charge-discharge circuit is configured so that a charge current flows to the charge storage element (the capacitor C1) through the first solid-state light-emitting element array (the first LED array 2A), and so that a discharge current flows from the charge storage element (the capacitor C1) to the second solid-state light-emitting element array (the second LED array 2B).

In the lighting device of the embodiment, the charge-discharge circuit includes the constant voltage circuit (the zener diode ZD1) connected in series with the charge storage element (the capacitor C1).

As described above, with the lighting device of the embodiment, the solid-state light-emitting element array (the fourth LED array 2D) can be lit even around the valley of the pulsating voltage, by discharging the electric energy (charged energy) in the charge storage element (the capacitor C1). Furthermore, the rush current can be prevented from flowing through the charge storage element (the capacitor C1) by the charge-discharge circuit (the charge-discharge controller) that includes the constant voltage circuit (the zener diode ZD1). Accordingly, the lighting device of the embodiment can suppress the fluctuation of the light output while preventing the rush current.

In the embodiment, preferably, at least one solid-state light-emitting element (the fourth LED array 2D) is electrically connected in parallel with the charge storage element (the capacitor C1).

In other words, the charge-discharge circuit preferably includes a series circuit of the constant current circuit (the third constant current regulator 3C) and at least one solid-state light-emitting element (the fourth LED array 2D) electrically connected across both ends of a series circuit of the charge storage element (the capacitor C1) and the constant voltage circuit (the zener diode ZD1).

Further in other words, preferably, a series circuit of a switch (the transistor Q13 of the third constant current regulator 3C) and at least one solid-state light-emitting element (the fourth LED array 2D) is electrically connected across both ends of a series circuit of the second solid-state light-emitting element array (the second LED array 2B) and the constant current regulator (the first constant current regulator 3A). The switch (the transistor Q13) is configured, upon the voltage VC1 across the charge storage element (the capacitor C1) being less than a predetermined threshold (the reference voltage Vf2 of the second solid-state light-emitting element array (the second LED array 2B)), to be turned on so that the discharge current from the charge storage element (the capacitor C1) flows through the at least one solid-state light-emitting element (the fourth LED array 2D).

With the lighting device of the embodiment having above described structure, the fourth LED array 2D is turned on around the valley of the pulsating voltage, and a specific LED array (the second LED array 2B) is not necessarily to be continuously supplied a current. As a result, it is possible to avoid a large current flowing in the specific LED array (the second LED array 2B), and accordingly possible to suppress differences in life times among the first to fourth LED arrays 2A to 2D.

(Embodiment 3)

A lighting device and an illuminating device according to Embodiment 3 will be described in detail with reference to FIGS. 5 and 6. The lighting device and the illuminating device of the embodiment have the basic structure common to that of the lighting device and the illuminating device of the Embodiment 2. Therefore, identical constituent elements to those of the lighting device and the illuminating device of the Embodiment 1 have been allocated identical reference numerals, and description thereof has been omitted as appropriate.

Figure 5:
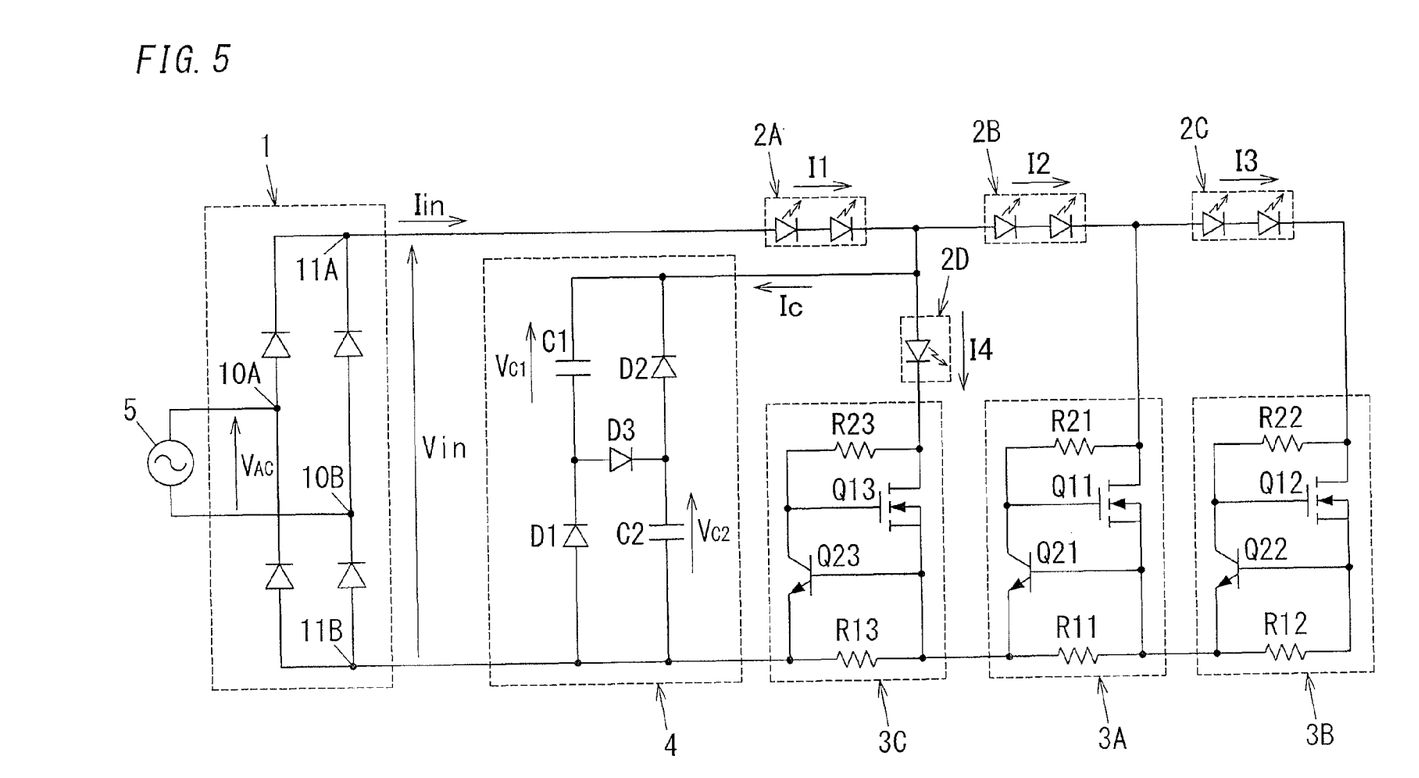
FIG. 5 is a circuit diagram of an illuminating device including a lighting device according to Embodiment 3.

As shown in FIG. 5, in the lighting device (illuminating device) of the embodiment, a charge-discharge circuit (a charge-discharge controller) is preferably a partial smoothing circuit (valley-fill circuit) 4.

The partial smoothing circuit 4 includes two capacitors C1 and C2, and three diodes D1 to D3. A first terminal (a positive terminal) of the capacitor C1 is electrically connected to a negative electrode of a first LED array 2A and a positive electrode of the fourth LED array 2D. A second terminal (a negative terminal) of the capacitor C1 is electrically connected to a cathode of the diode D1. An anode of the diode D1 is electrically connected to a second output terminal 11B of a rectifier 1 and a second terminal (a negative terminal) of the capacitor C2. A first terminal (a positive terminal) of the capacitor C2 is electrically connected to an anode of the diode D2 and a cathode of the diode D3. A cathode of the diode D2 is electrically connected to the first terminal (the positive terminal) of the capacitor C1, the negative electrode of the first LED array 2A and the positive electrode of the fourth LED array 2D. Since such a partial smoothing circuit 4 has been known, detail explanation of operations thereof is not described herein.

Operations of the lighting device (the illuminating device) in the embodiment will be described with reference to the circuit diagram of FIG. 5 and the waveform charts of FIG. 6.

Figure 6:
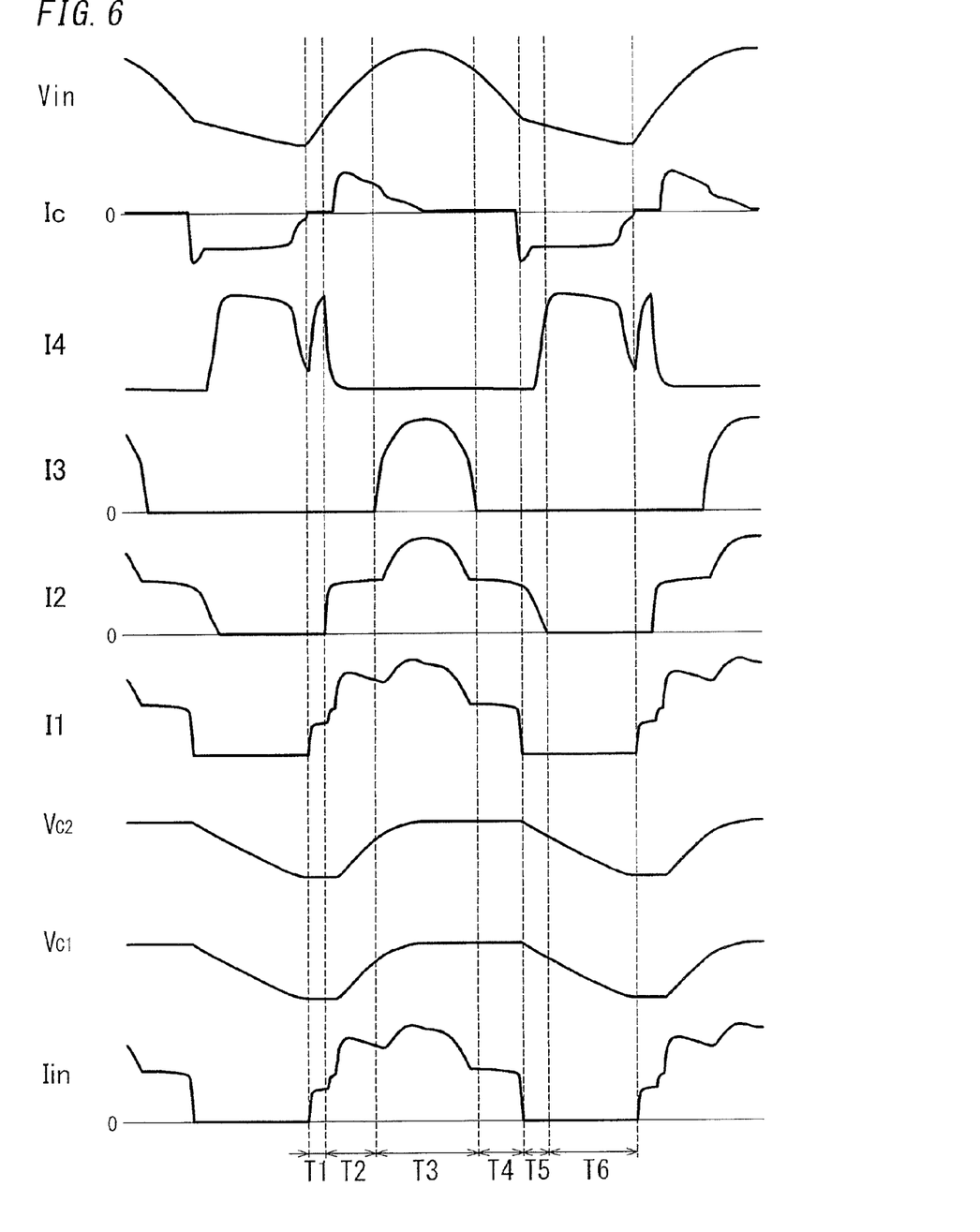
FIG. 6 is waveform charts illustrating operations in the Embodiment 3.

In FIG. 6, "Vin" illustrates an output voltage of the rectifier 1 (supply voltage). "Ic" illustrates a current flowing through the partial smoothing circuit 4 (the direction indicated by an arrow in FIG. 5 is defined as a positive direction). "I4" to "I1" illustrate currents flowing through the fourth LED array 2D to the first LED array 2A, respectively. "VC1" and "VC2" respectively illustrate voltages across the capacitors C1 and C2 (the directions indicated by arrows in FIG. 5 are defined as a positive direction). "Iin" illustrates a supply current (an output current of the rectifier 1).

(Time Period T1)

During the time period T1, the output voltage Vin of the rectifier 1 is higher than the total of the reference voltage Vf1 of the first LED array 2A and the reference voltage Vf4 of the fourth LED array 2D (Vin>Vf1+Vf4). Also, during the time period T1, the output voltage Vin of the rectifier 1 is lower than the total of the reference voltage Vf1 of the first LED array 2A and the reference voltage Vf2 of the second LED array 2B (Vin<Vf1+Vf2). In the time period T1, therefore, the first LED array 2A and the fourth LED array 2D are electrically conducting and a current T1, I4 flows through the first LED array 2A and the fourth LED array 2D. The current I4 flows to the third constant current regulator 3C, and the current I4 (I1) is adjusted to a constant current by the operation of the third constant current regulator 3C. The first LED array 2A and the fourth LED array 2D are lit by the current T1, I4 flowing therethrough.

(Time Period T2)

When the output voltage Vin of the rectifier 1 increases to exceed the total of the reference voltage Vf1 of the first LED array 2A and the reference voltage Vf2 of the second LED array 2B (Vin>Vf1+Vf2), the second LED array 2A becomes electrically conducting and a current I2 starts flowing through the second LED array 2B. The current I2 flows to the first constant current regulator 3A, and the current I2 (I1) is adjusted to a constant current by the operation of the first constant current regulator 3A. The first LED array 2A and the second LED array 2B are lit by the current T1, I2 flowing therethrough. In this period, the current I2 flows through the first constant current regulator 3A to the resistor R13 of the third constant current regulator 3C (see FIG. 3). The target value for the current I4 in the third constant current regulator 3C is apparently-reduced (the transistor Q13 is kept turned off), and the fourth LED array 2D turns off.

When the output voltage Vin of the rectifier 1 increases to exceed the total of the reference voltages Vf1 of the first LED array 2A, the voltage VC1 across the capacitor C1 and the voltage VC2 across the capacitor C2 (Vin>Vf1+VC1+VC2), a current IC flows to the partial smoothing circuit 4, and thereby the two capacitors C1 and C2 are charged. The respective voltages VC1 and VC2 across the capacitors C1 and C2 gradually increase.

(Time Period T3)

When the output voltage Vin of the rectifier 1 increases to exceed the total of the reference voltages Vf1 to Vf3 of the first to third LED arrays 2A to 2C (Vin>Vf1+Vf2+Vf3), the third LED array 2C becomes electrically conducting and a current I3 starts flowing through the third LED array 2C. The current I3 flows to the second constant current regulator 3B, and the current I3 (I1, I2) is adjusted to a constant current by the operation of the second constant current regulator 3B. The first LED array 2A, the second LED array 2B and the third LED array 2C are lit by the current I1, I2, I3 flowing therethrough. By the current I3 flowing through the second constant current regulator 3B to the resistor R11, the first constant current regulator 3A stops operating.

The output voltage Vin of the rectifier 1 passes through the maximum, and when the output voltage Vin decreases to be lower than the total of the reference voltage Vf1 of the first LED array 2A, the voltage VC1 across the capacitor C1 and the voltage VC2 across the capacitor C2 (Vin<Vf1+VC1+VC2), the charging of the partial smoothing circuit stops.

(Time Period T4)

When the output voltage Vin of the rectifier 1 decreases to be lower than the total of the reference voltages Vf1 to Vf3 of the first to third LED arrays 2A to 2C (Vin<Vf1+Vf2+Vf3), the third LED array 2C becomes electrically non-conducting, the second constant current regulator 3B stops operating, and the current I3 stops flowing through the third LED array 2A. Thus, the third LED array 2C turns off, and the first constant current regulator 3A restarts operating. By the first constant current regulator 3A operating, a current I1, I2 flows through the first LED array 2A and the second LED array 2B, and the first LED array 2A and the second LED array 2B are lit by the current flowing therethrough.

(Time Period T5)

When the output voltage Vin of the rectifier 1 decreases to be lower than the total of the reference voltage Vf1 of the first LED array 2A and the reference voltage Vf2 of the second LED array 2B (Vin<Vf1+Vf2), the electric energy (charged energy) in the capacitors C1, C2 of the partial smoothing circuit 4 is discharged. The first constant current regulator 3A keeps operating in this period so that the current I2 flows through the second LED array 2B. The second LED array 2B is kept lit by the current I2 flowing therethrough. The output current of the rectifier 1 (supply current Iin) stops, and the first LED array 2A turns off.

(Time Period T6)

Each of the voltages VC1 and VC2 across the capacitors C1 and C2 gradually decreases according to the discharge. When each of the voltages VC1 and VC2 across the capacitors C1 and C2 decreases to be lower than the reference voltage Vf2 of the second LED array 2B (VC1<Vf2, VC2<Vf2), the fourth LED array 2D becomes electrically conducting and the discharge current (the current I4) of the partial smoothing circuit 4 flows through the fourth LED array 2D. The current I4 flows to the third constant current regulator 3C to start the third constant current regulator 3C operating, and the fourth LED array 2D is turned on. Then, the next time period T1 starts when the output voltage Vin of the rectifier 1 increases to exceed the total of the reference voltage Vf1 of the first LED array 2A and the reference voltage Vf4 of the fourth LED array 2D (Vin>Vf1+Vf4).

Accordingly, with the lighting device (the illuminating device) of the embodiment, the partial smoothing circuit 4 is charged by the supply current Iin around the peak of the supply voltage Vin, and the fourth LED array 2C can be lit by the discharge current I4 from the capacitor C1 around the valley of the supply voltage Vin. The lighting device (the illuminating device) of the embodiment continuously turns on any of the first to fourth LED arrays 2A to 2D during one cycle of the AC voltage of the AC power source 5, and thus can reduce ripple contained in the emitting light, compared with the conventional example. Furthermore, with the lighting device (the illuminating device) of the embodiment, there is no LED array that keeps turning on during one cycle of the AC power source 5 as is the second LED array 2B in the Embodiment 1. The lighting device (the illuminating device) of the embodiment can avoid a large current flowing in a specific LED array (the second LED array 2B), and accordingly can suppress differences in life times among the first to fourth LED arrays 2A to 2D.

Furthermore, the lighting device (the illuminating device) of the embodiment has a superior circuit efficiency compared to the lighting device (the illuminating device) of the Embodiment 2, because the power consumption in the zener diode ZD1 is not required.

As described above, the lighting device of the embodiment is configured to light a light source that includes at least the first solid-state light-emitting element array (the first LED array 2A) and the second solid-state light-emitting diode arrays (the second LED array 2B). The lighting device includes the rectifier 1, the constant current regulator (the first constant current regulator 3A) and the charge-discharge circuit (the partial smoothing circuit 4). The rectifier 1 has the pair of input terminals 10A and 10B and the pair of output terminals 11A and 11B. The rectifier 1 is configured to rectify the sinusoidal AC voltage received through the pair of input terminals 10A and 10B to output the produced pulsating voltage through the pair of output terminals 11A, 11B. The constant current regulator (the first constant current regulator 3A) is electrically connected in series with the first and second solid-state light-emitting element arrays (the first and second LED arrays 2A and 2B) between the pair of output terminals 11A and 11B of the rectifier 1. The constant current regulator (the first constant current regulator 3A) is configured to adjust a current flowing through the second solid-state light-emitting element array (the second LED array 2B) to a constant current. The charge-discharge circuit (the partial smoothing circuit 4) is electrically connected in series with the first solid-state light-emitting element array (the first LED array 2A) between the pair of output terminals 11A and 11B of the rectifier 1. The charge-discharge circuit includes the charge storage element (the capacitor C1 and the capacitor C2). The charge-discharge circuit is configured so that a charge current flows to the charge storage element (the capacitor C1 and the capacitor C2) through the first solid-state light-emitting element array (the first LED array 2A), and so that a discharge current flows from the charge storage element (the capacitor C1 and the capacitor C2) to the second solid-state light-emitting element array (the second LED array 2B).

In the embodiment, preferably, the charge-discharge controller includes the partial smoothing circuit 4 constituted by charge storage elements (the capacitor C1 and the capacitor C2) and rectifier elements (the diodes D1 to D3).

In other words, in the lighting device of the embodiment, the lighting device includes the charge storage elements (the capacitors C1 and C2). The charge-discharge circuit includes the partial smoothing circuit 4 constituted by the charge storage elements (the capacitors C1 and C2) and the rectifier elements (the diodes D1 to D3).

The lighting device (the illuminating device) of the embodiment having the above structure can suppress power consumption and has superior circuit efficiency, compared to a case (e.g., Embodiment 2) that includes the zener diode ZD1.

The charge-discharge circuit preferably includes a series circuit of the constant current circuit (the third constant current regulator 3C) and at least one solid-state light-emitting element (the fourth LED array 2D) electrically connected across both ends of the partial smoothing circuit 4.

In other words, preferably, a series circuit of a switch (the transistor Q13 of the third constant current regulator 3C) and at least one solid-state light-emitting element (the fourth LED array 2D) is electrically connected across both ends of a series circuit of the second solid-state light-emitting element array (the second LED array 2B) and the constant current regulator (the first constant current regulator 3A). The switch (the transistor Q13) is configured, upon the voltage across the partial smoothing circuit (the voltage VC1 across the capacitor C1, the voltage VC2 across the capacitor C2) being less than a predetermined threshold (the reference voltage Vf2 of the second solid-state light-emitting element array (the second LED array 2B)), to be turned on so that the discharge current from the charge storage element (the capacitor C1, C2) flows through the at least one solid-state light-emitting element (the fourth LED array 2D).

(Embodiment 4)

Figure 7A:
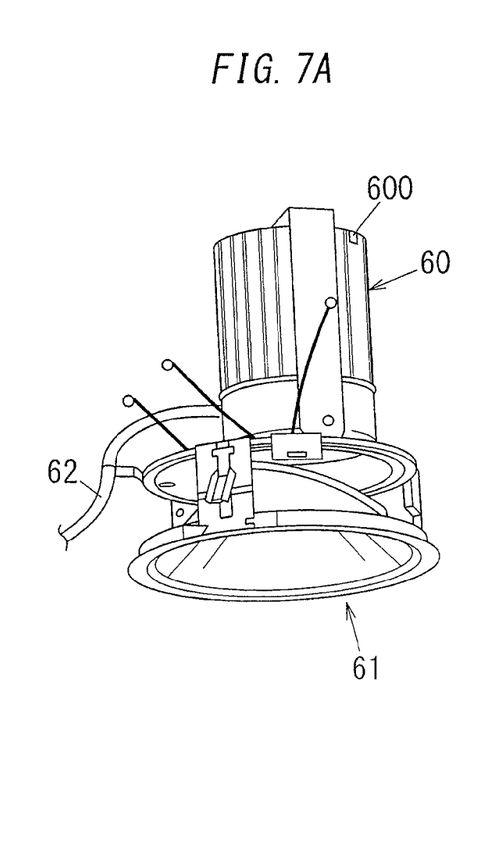
FIGS. 7A to 7C are perspective views of light fixtures according to Embodiment 4.

Light fixtures according to Embodiment 4 will be described in detail with reference to FIGS. 7A to 7C. Preferably, a light fixture according to the embodiment is a downlight configured to be embedded in a ceiling, as shown in FIG. 7A. This light fixture includes an illuminating device (a lighting device and a light source) according to any one of the Embodiments 1 to 3, a fixture body 60 in which the illuminating device is housed, and a reflector 61. Two or more heat radiating fins 600 protrudes from the top part of the fixture body 60. A power cable 62 extends from the fixture body 60 and is to be electrically connected to an AC power source 5.

Figure 7B:
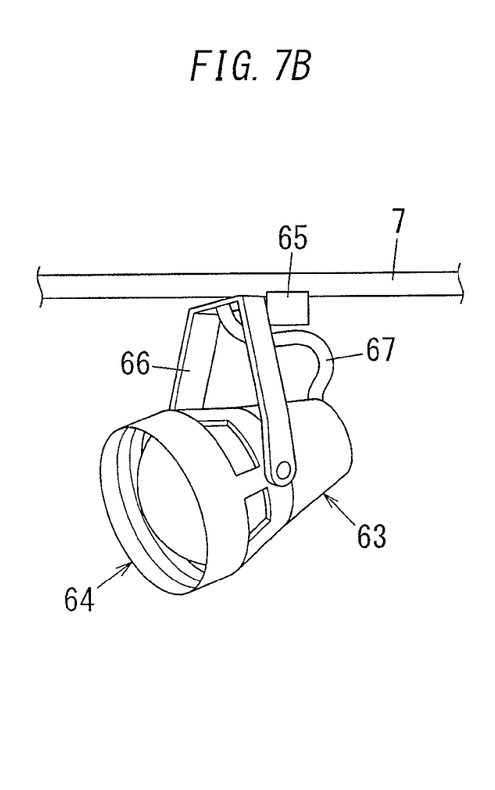
Figure 7C:
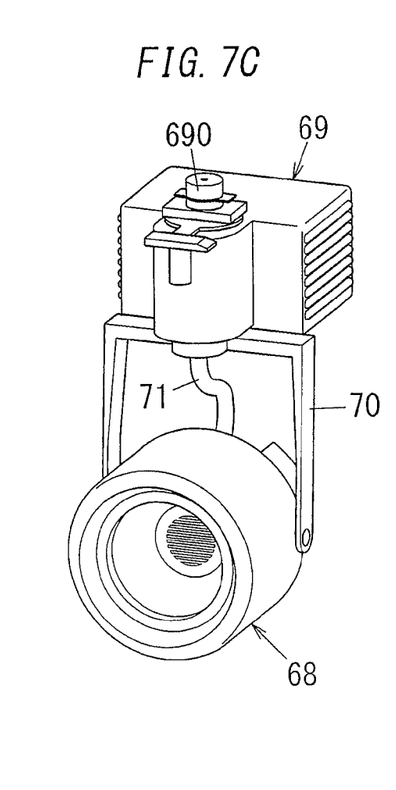

Alternatively, a light fixture according to the embodiment may be a spotlight configured to be attached to a wiring duct 7, as shown in FIG. 7B or 7C.

The light fixture as shown in FIG. 7B includes an illuminating device according to any one of the Embodiments 1 to 3, a fixture body 63 in which the illuminating device is housed, a reflector 64, a connector 65 to be connected to the wiring duct 7, and an arm 66 that couples the connector 65 and the fixture body 63. The connector 65 and the lighting device are electrically connected with each other with a power cable 67.

The light fixture as shown in FIG. 7C includes an illuminating device (a lighting device and a light source) according to any one of the Embodiments 1 to 3, a fixture body 68 in which the light source (first to third LED arrays 2A to 2C) is housed, a box 69 in which the lighting device is housed, and a coupler 70 that couples the fixture body 68 and the box 69. The light fixture of FIG. 7C further includes a power cable 71 that electrically connects between the light source and the lighting device. A connector 690 configured to be electrically and mechanically connected detachably to the wiring duct 7 is provided on the top face of the box 69. The light fixture of the embodiment includes the illuminating device (the lighting device and the first to third LED arrays 2A to 2C) and fixture body 60 (63; 68, 69) that holds the illuminating device. Note that a fourth LED array 2D may be further provided, according to the Embodiments 2 and 3.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An illumination device, comprising:
   a rectifier having a pair of input terminals and a pair of output terminals, and configured to rectify a sinusoidal AC voltage received through the pair of input terminals to output a rectified pulsating voltage through the pair of output terminals;
   a first series circuit of a charge-discharge circuit and a first solid-state light-emitting element array, the first series circuit being electrically connected between the pair of output terminals of the rectifier; and
   a second series circuit of a constant current regulator and a second solid-state light-emitting element array, the second series circuit being electrically connected in parallel to the charge-discharge circuit, the constant current regulator being configured to adjust a current flowing through the second solid-state light-emitting array to a constant current,
   the first solid-stage light-emitting element array having an anode electrically connected to a higher potential side output terminal of the pair of output terminals,
   the second solid-state light-emitting element array having an anode electrically connected to a cathode of the first solid-state light-emitting element, and
   the charge-discharge circuit including a charge storage element, and configured so that a charge current flows to the charge storage element through the first solid-state light-emitting element array, and so that a discharge current flows from the charge storage element to the second solid-state light-emitting element array.

2. The illumination device according to claim 1, wherein the charge-discharge circuit includes a constant current circuit connected in series with the charge storage element.

3. The illumination device according to claim 1, wherein the charge-discharge circuit includes a constant voltage circuit connected in series with the charge storage element.

4. The illumination device according to claim 3, wherein the charge-discharge circuit further includes a third series circuit of at least one solid-state light-emitting element and a constant current circuit, the third series circuit being electrically connected between both ends of a series circuit of the charge storage element and the constant voltage circuit.

5. The illumination device according to claim 1, wherein the lighting device includes charge storage elements, and
   the charge-discharge circuit includes a partial smoothing circuit constituted by the charge storage elements and rectifier elements.

6. The illumination device according to claim 5, wherein the charge-discharge circuit further includes a fourth series circuit of at least one solid-state light-emitting element and a constant current circuit, the fourth series circuit being electrically connected across both ends of the partial smoothing circuit.

7. A light fixture comprising:
   the illuminating device according to claim 1; and
   a fixture body that holds the illumination device.

* * * * *